Nov. 7, 1933.  J. LITTLE  1,934,547

MANUFACTURE OF RUBBER ARTICLES

Filed Dec. 1, 1932

Inventor
Jesse Little
By Nathaniel Frucht
his Attorney

Patented Nov. 7, 1933

1,934,547

UNITED STATES PATENT OFFICE 1,934,547

MANUFACTURE OF RUBBER ARTICLES

Jesse Little, Warwick Neck, R. I., assignor to Davol Rubber Company, Providence, R. I., a corporation of Rhode Island Application December 1, 1932. Serial No. 645,194

8 Claims. (Cl. 18—56)

My present invention relates to the manufacture of articles from rubber and the like, and has particular reference to the manufacture of rubber articles having substantially flat and adjacent interior surfaces, such as hot water bags and the like.

The manufacture, sale and use of rubber bags and the like has heretofore entailed difficulty because the inner surfaces tend to stick and become welded. This tendency is particularly noticeable in molded articles, as the articles must be stripped from the cores after curing and dried, the stripping requiring an injection of soapy solution or of dusting compound to permit easy sliding removal of the core, and the drying requiring hanging to permit free circulation of air. It is the principal object of my invention to devise a molding method and apparatus which facilitates dry stripping and does not require use of soapy solutions or of dusting compounds; it is a further object of my invention to devise a finish for the inner surfaces which will permit free air circulation and facilitate drying.

After the articles have been stripped and dried, they are trimmed and finished; it has heretofore been necessary to use dusting powders during these manufacturing operations, in order to prevent contacting engagement and adherence of the adjacent inner surfaces. It has been found that the improved finish for the inner surfaces prevents sticking and adhering during the manufacturing operations, and thus eliminates the operating step of dusting.

The vulcanization is preferably almost complete, as completely vulcanized rubber articles become brittle and their usable life is reduced; it has therefore been necessary heretofore to insert a mechanical separator such as a cardboard strip within the article during storage and shipment, and to caution purchasers to slightly inflate the articles after use, in order to prevent contact of the inner walls and resultant sticking and adhesion. The articles having my improved finish for the inner walls do not need insertion of a mechanical separator, thus further reducing manufacturing expense, and do not require inflation after use, thus increasing both convenience and satisfaction for the user.

With the above and other advantageous features and objects in view, my invention consists of a novel article, a novel apparatus, and a novel method of manufacture more fully disclosed in the detailed description following, in conjunction with the accompanying drawing, and more specifically defined in the claims appended thereto.

Figure 1:
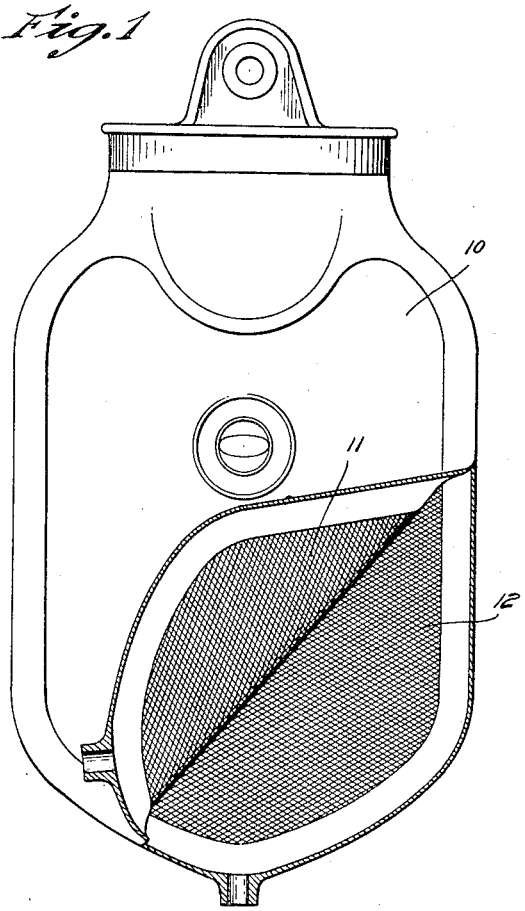
Figure 1 represents a hot water bag constructed in accordance with my novel method, part of the upper surface being turned back to disclose the finish of the interior surfaces.
Figure 2:
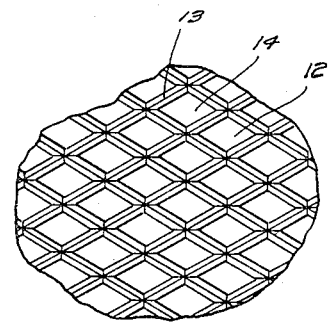
Figure 2 is a fragmentary enlarged view of a preferred finish for the interior surfaces.
Figure 3:
Figure 3 is a fragmentary enlarged cross section through Figure 1, showing the contiguous relation of the interior surfaces.
Figure 4:
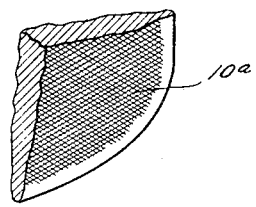
Figure 4 is a fragmentary portion of a mold core.

Referring to the drawing, the hot water bag 10 is molded in one piece; the surface of the core 10a is so shaped, preferably by engraving, that the contiguous inner surfaces 11 and 12 of the bag have a rough or corrugated finish of alternate projections 13 and hollows or indentations 14, which projections and indentations may be of any desired shape and size. The breaking up of the inner surfaces of the article permit dry stripping of the core, without use of soapy solutions or of dusting compound, thus reducing the expense and increasing the speed of manufacture; and the projections and indentations provide point contact only, as indicated in Figure 3, and thus prevent contacting engagement of the inner surfaces and permit free circulation of air to facilitate and expedite drying.

It has been found that the use of an inner surface finish as above described eliminates need for dusting during subsequent manufacturing operations, and that the customary cardboard or paper insert which has heretofore been inserted within the hot water bag to prevent adherence of the inner surfaces may be dispensed with, thus further reducing manufacturing cost by eliminating the mechanical separator and the step of inserting it in the article. Moreover, the user need no longer distend or inflate the article after use in order to keep the inner surfaces out of contacting engagement, thus increasing the life of the article and resulting in increased satisfaction on the part of the user.

Figure 5:
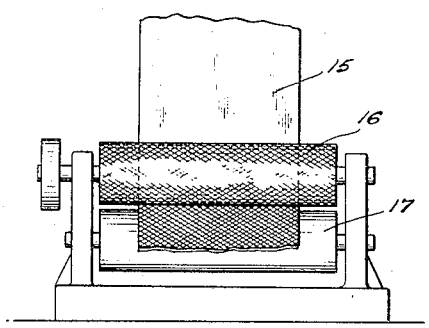
Figure 5 is a fragmentary detail showing a mechanical arrangement for producing the desired interior finish.

Other methods of producing the desired irregular finish for the interior surfaces may be utilized, such as producing a knurled or pebbly effect by subjecting rubber sheets to rolling as indicated in Figure 5, wherein the rubber sheet 15 is passed between two rotating rollers 16 and 17, at least one of these rollers being knurled or otherwise embossed so as to produce a corresponding finish on the surface of the rubber sheet. It has also been proposed to roughen the inner surfaces on a wire wheel after curing, to use sand blasting, to treat the inner surfaces with a chemical solution such as acetone solution, and to use solutions of talc with glue in order to obtain a non-sticking coating; but these methods have not proven as satisfactory, as efficient, and as inexpensive as the formation of a corrugated or rough finish for the surfaces during the molding operation.

A similar finish may be used in the manufacture of other rubber articles having adjacent inner surfaces, or for similar articles made of rubber compound and other plastic materials which have the same tendency to contact, stick, and adhere during their manufacture, storage and use.

While I have described a specific constructional embodiment of my invention and an apparatus and a method for producing the constructional embodiment, any desired changes in the apparatus, in the method, and in the design of the inner surface finish or its general arrangement may be made, within the spirit and the scope of the invention as defined in the appended claims.

I claim:

1. In the manufacture of flexible containers, the steps of welding together two sheets of substantially uniform thickness over a central plate type core having a roughened face and pressing the sheets to the core to produce a roughened finish on the sheet surface contiguous the roughened core face while maintaining the sheet thickness substantially uniform.

2. In the manufacture of flexible containers, the steps of welding together two sheets of substantially uniform thickness over a central plate type core having a knurled face and pressing the sheets to the core to produce a knurled finish on the sheet surface contiguous the knurled core face while maintaining the sheet thickness substantially uniform.

3. Apparatus for the manufacture of flexible containers, comprising an outer mold for welding the sheets at their side and bottom edges, and a central plate type core having one face roughened over substantially its entire area.

4. Apparatus for the manufacture of flexible containers, comprising an outer mold for welding the sheets at their side and bottom edges, and a central plate type core having one face knurled over substantially its entire area.

5. A core for molding flexible articles, having two substantially flat opposed faces, one of said faces being roughened over substantially its entire area.

6. A core for molding flexible articles, having two substantially flat opposed faces, one of said faces being knurled over substantially its entire area.

7. A flexible container made of plastic material and having thin flexible contiguous walls of substantially uniform thickness, the finish of the inner surface of at least one wall being roughened.

8. A flexible container made of plastic material and having thin flexible contiguous walls of substantially uniform thickness, the finish of the inner surface of at least one wall being knurled.

JESSE LITTLE.